United States Patent
Nishigori

(10) Patent No.: US 11,777,624 B2
(45) Date of Patent: Oct. 3, 2023

(54) DISPLAY SYSTEM

(71) Applicant: SMC CORPORATION, Tokyo (JP)

(72) Inventor: Akira Nishigori, Kashiwa (JP)

(73) Assignee: SMC CORPORATION, Tokyo (JP)

( * ) Notice: Subject to any disclaimer, the term of this patent is extended or adjusted under 35 U.S.C. 154(b) by 0 days.

(21) Appl. No.: 17/688,943

(22) Filed: Mar. 8, 2022

(65) Prior Publication Data

US 2022/0294547 A1    Sep. 15, 2022

(30) Foreign Application Priority Data

Mar. 11, 2021   (JP) .................................. 2021-039040

(51) Int. Cl.
| | |
|---|---|
| *H04B 17/382* | (2015.01) |
| *H04B 17/10* | (2015.01) |
| *H04B 17/13* | (2015.01) |
| *G09G 3/20* | (2006.01) |
| *H04L 5/00* | (2006.01) |

(52) U.S. Cl.
CPC ......... *H04B 17/382* (2015.01); *G09G 3/2092* (2013.01); *H04B 17/102* (2015.01); *H04B 17/13* (2015.01); *H04L 5/0098* (2013.01); *G09G 2370/16* (2013.01)

(58) Field of Classification Search
CPC .... H04B 17/382; H04B 17/102; H04B 17/13; G09G 2370/16; G09G 3/2092; H04L 5/0098
See application file for complete search history.

(56) References Cited

U.S. PATENT DOCUMENTS

| | | | |
|---|---|---|---|
| 2010/0194985 A1 | 8/2010 | Unger et al. | |
| 2014/0080427 A1* | 3/2014 | Babitch ................. | H04B 15/04 455/78 |
| 2016/0316422 A1* | 10/2016 | Regan .................... | H04W 24/02 |
| 2019/0274112 A1* | 9/2019 | Kleinbeck ............. | H04W 24/08 |

FOREIGN PATENT DOCUMENTS

| | | |
|---|---|---|
| JP | 11-261557 A | 9/1999 |
| WO | WO 2011/014109 A1 | 2/2011 |

OTHER PUBLICATIONS

Extended European Search Report dated Aug. 2, 2022 in European Patent Application No. 22160695.7, 13 pages.

* cited by examiner

*Primary Examiner* — Gerald Johnson
(74) *Attorney, Agent, or Firm* — Oblon, McClelland, Maier & Neustadt, L.L.P.

(57) ABSTRACT

A display system which displays, on a display unit, recommended frequencies recommended for use in wireless devices that carry out transmission and reception of data by switching between hopping frequencies in a predetermined frequency band, the display system including a measurement unit that measures, within a set time period set in advance, frequencies and power levels of radio waves propagating around a periphery of the wireless devices, and a control unit which determines frequencies of the radio waves for which the power levels measured by the measurement unit are less than a power threshold value set in advance, as being the recommended frequencies, and causes the display unit to display the recommended frequencies.

7 Claims, 15 Drawing Sheets

| CHANNEL | CENTER FREQUENCY [MHz] | OCCUPIED FREQUENCY BAND [MHz] |
|---|---|---|
| 1ch | 2412 | 2401-2423 |
| 2ch | 2417 | 2406-2428 |
| 3ch | 2422 | 2411-2433 |
| 4ch | 2427 | 2416-2438 |
| 5ch | 2432 | 2421-2443 |
| 6ch | 2437 | 2426-2448 |
| 7ch | 2442 | 2431-2453 |
| 8ch | 2447 | 2436-2458 |
| 9ch | 2452 | 2441-2463 |
| 10ch | 2457 | 2446-2468 |
| 11ch | 2462 | 2451-2473 |
| 12ch | 2467 | 2456-2478 |
| 13ch | 2472 | 2461-2483 |
| 14ch | 2484 | 2473-2495 |

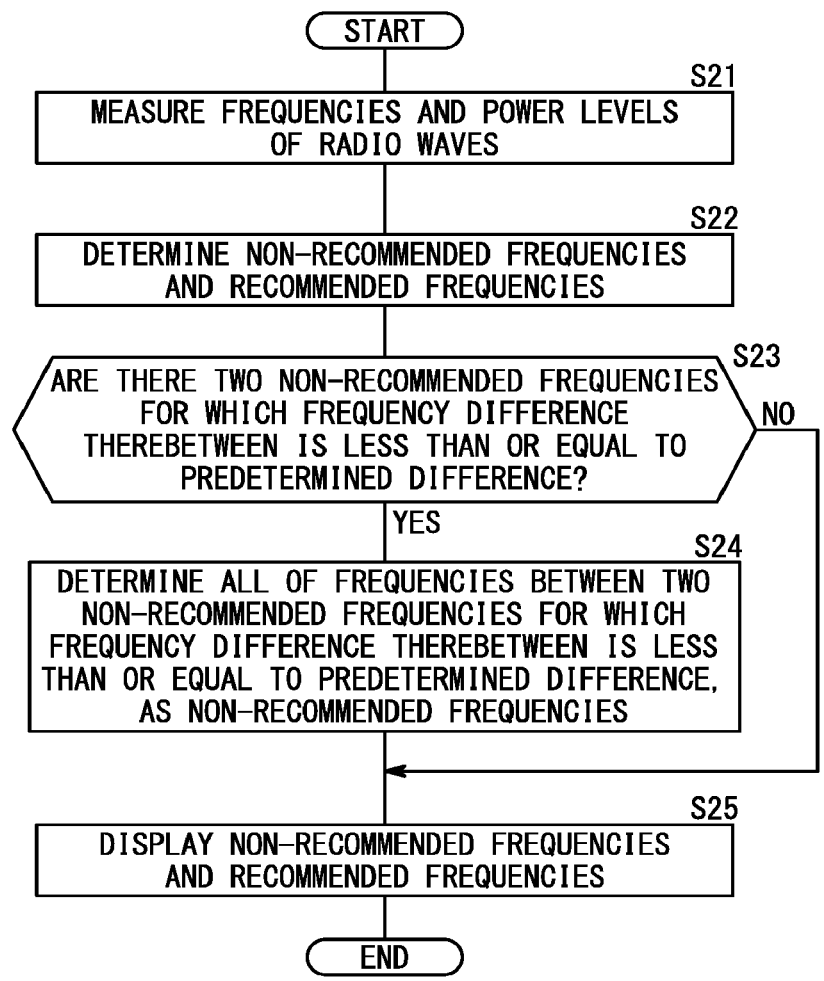

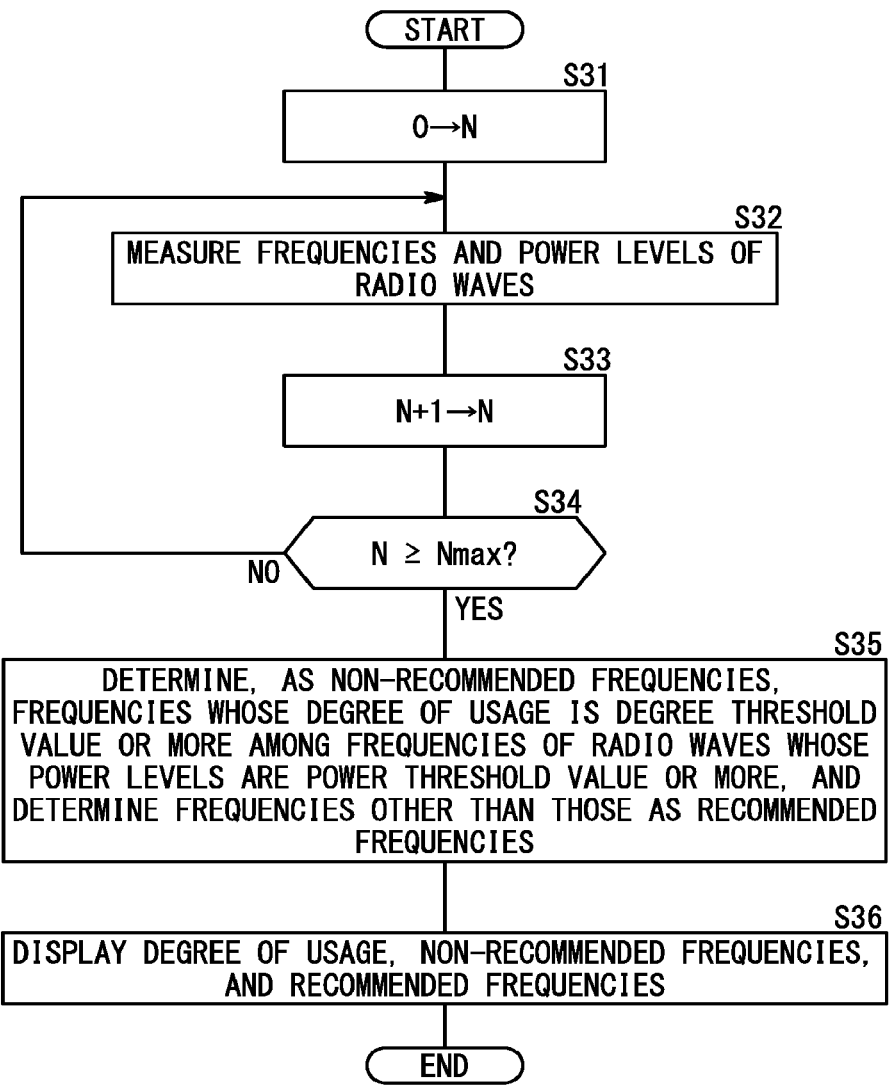

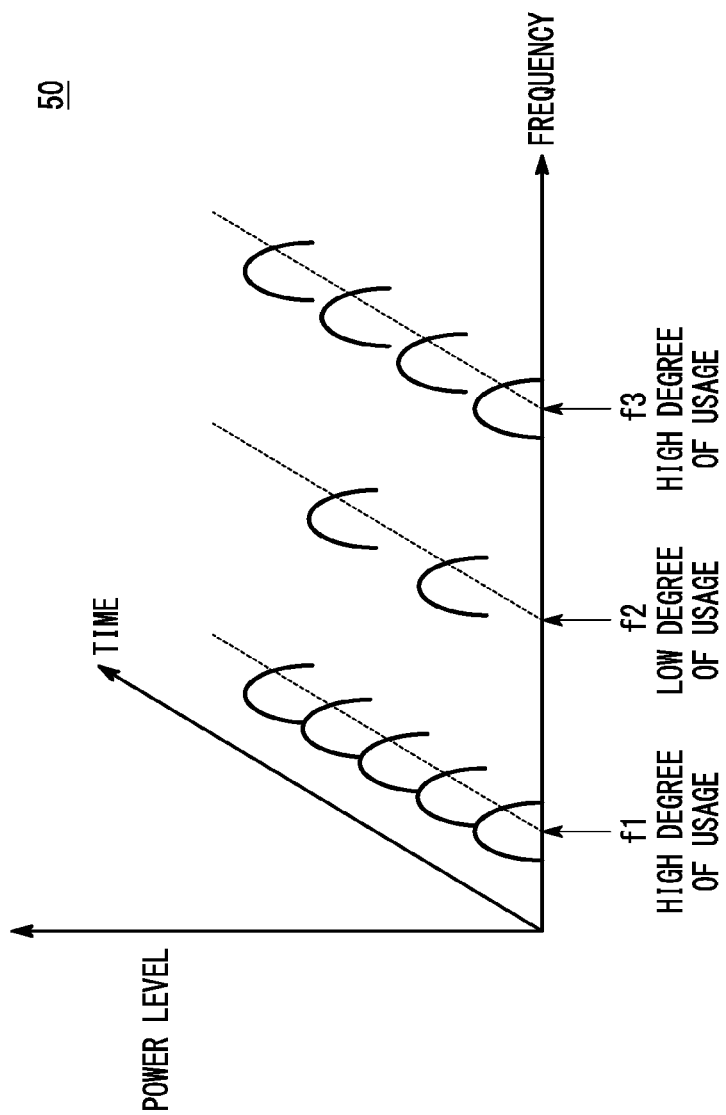

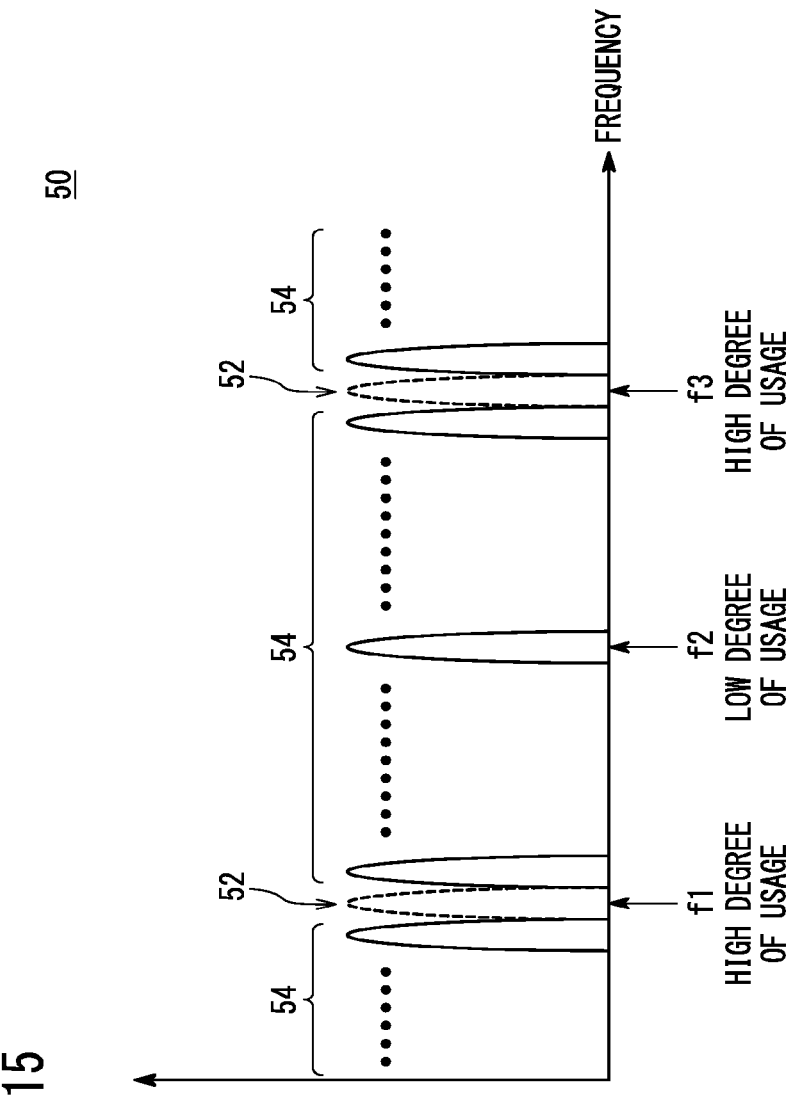

DISPLAY SYSTEM

CROSS-REFERENCE TO RELATED APPLICATIONS

This application is based upon and claims the benefit of priority from Japanese Patent Application No. 2021-039040 filed on Mar. 11, 2021, the contents of which are incorporated herein by reference.

BACKGROUND OF THE INVENTION

Field of the Invention

The present invention relates to a display system that displays frequencies in a predetermined frequency band.

Description of the Related Art

In JP H11-261557 A, a network for FA (frequency analysis) is disclosed. Such an FA network is provided in industrial equipment in which robots and the like are used. Such an FA network includes a master and a plurality of slaves. The master and the plurality of slaves transmit and receive data to and from each other in a wireless manner.

SUMMARY OF THE INVENTION

A 2.4 GHz frequency band (ISM band) is generally open to the public. The number of wireless devices that perform data communication using the 2.4 GHz frequency band is increasing. Therefore, the possibility that interference between radio waves will occur in the 2.4 GHz frequency band is becoming higher.

In the case that a user who manages industrial equipment newly installs a wireless device in the industrial equipment, it is necessary to set the frequencies used by the wireless device while avoiding frequencies that are already being used. Accordingly, in the case that a plurality of channels are used, it is necessary for the user to investigate which frequencies are not being used. The frequencies that are not being used are also referred to as free frequencies. Such an operation is troublesome for the user to perform.

The present invention has the object of solving the aforementioned problem.

A first aspect of the present invention is characterized by a display system that displays, on a display unit, recommended frequencies recommended for use in a wireless device configured to carry out transmission and reception of data by switching between hopping frequencies in a predetermined frequency band, the display system comprising a measurement unit configured to measure, within a set time period set in advance, frequencies and power levels of radio waves propagating around a periphery of the wireless device, and a control unit configured to determine frequencies of the radio waves for which the power levels measured by the measurement unit are less than a power threshold value set in advance, as being the recommended frequencies, and to cause the display unit to display the recommended frequencies.

A second aspect of the present invention is characterized by a display system that displays, on a display unit, non-recommended frequencies not recommended for use in a wireless device configured to carry out transmission and reception of data by switching between hopping frequencies in a predetermined frequency band, the display system comprising a measurement unit configured to measure, within a set time period set in advance, frequencies and power levels of radio waves propagating around a periphery of the wireless device, and a control unit configured to determine frequencies of the radio waves for which the power levels measured by the measurement unit are greater than or equal to a power threshold value set in advance, as being the non-recommended frequencies, and to cause the display unit to display the non-recommended frequencies.

According to the present invention, the user can easily be made aware of the free frequencies existing within a predetermined frequency band.

The above and other objects, features, and advantages of the present invention will become more apparent from the following description when taken in conjunction with the accompanying drawings, in which preferred embodiments of the present invention are shown by way of illustrative example.

BRIEF DESCRIPTION OF THE DRAWINGS

FIG. 3 is a diagram showing an example of frequency information;

FIG. 12 is a flowchart showing a third display process performed by the display system;

FIG. 13 is a flowchart showing a fourth display process performed by the display system;

FIG. 14 is a diagram showing results of measurement of power levels performed periodically; and FIG. 15 is a diagram showing an example of an image displayed by the display unit in the fourth display process.

DESCRIPTION OF THE INVENTION

1. Industrial Wireless Communication System 10

Figure 1:
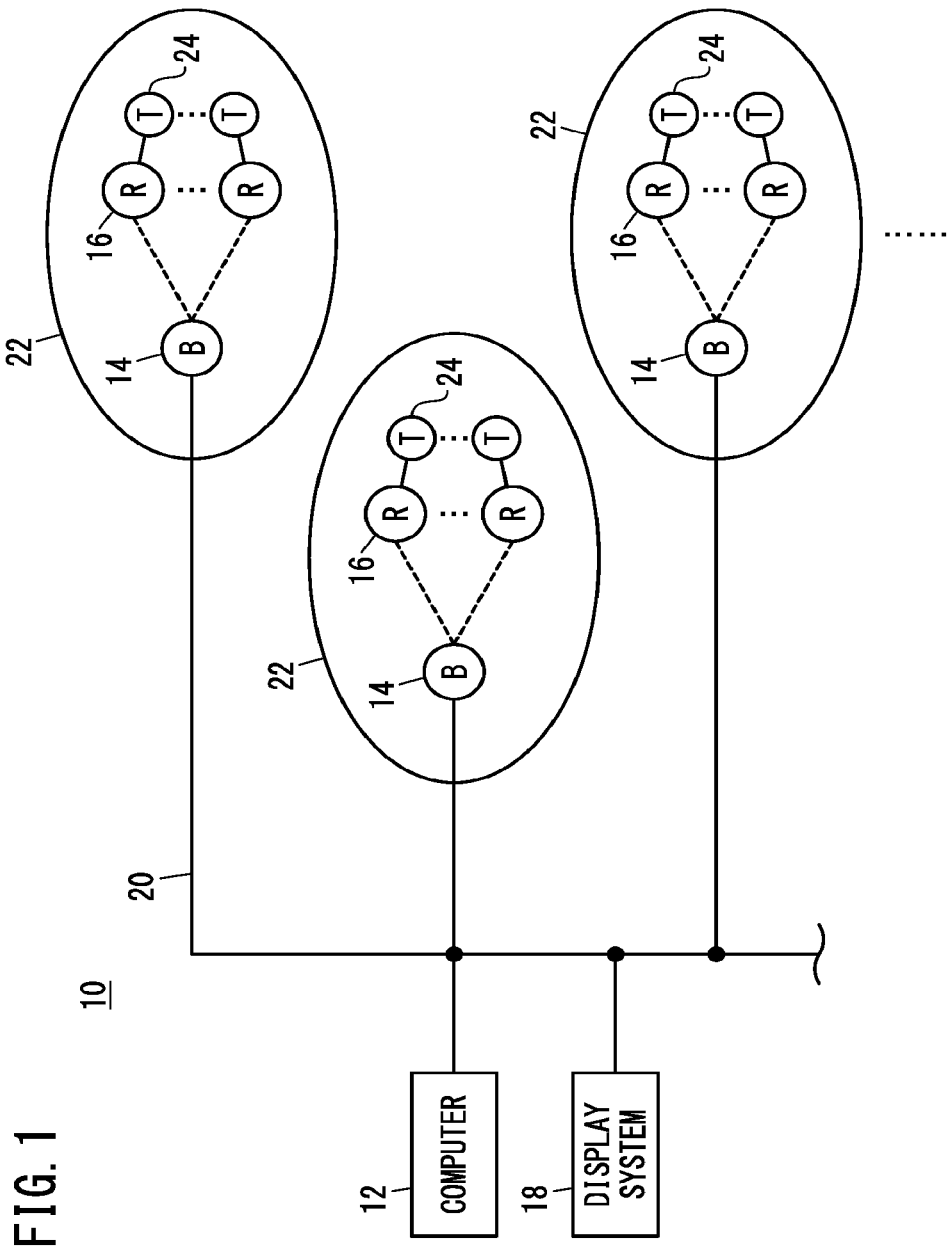
FIG. 1 is a diagram showing the configuration of an industrial wireless communication system in which a display system is used.

FIG. 1 is a diagram showing the configuration of an industrial wireless communication system 10 in which a display system 18 is used. In the industrial wireless communication system 10, there are provided a single computer 12, a plurality of base wireless devices 14, a plurality of remote wireless devices 16, and the display system 18. The industrial wireless communication system 10 is equipped with a plurality of networks 22. A single base wireless device 14 and a plurality of remote wireless devices 16 are provided in one of the networks 22. The single computer 12, the plurality of base wireless devices 14, and the display system 18 are connected over wires or wirelessly in order to enable communication therebetween. The wired connection may be a fieldbus 20. The wireless connection may be by way of short-range wireless communication. The plurality of remote wireless devices 16 are synchronously connected to the single base wireless device 14.

The computer 12 is capable of monitoring and controlling the industrial equipment. Although not limited to this feature, the computer 12 is constituted, for example, by a PLC (programmable logic controller). The computer 12 is capable of carrying out communication with other devices using an input/output interface (not shown).

The base wireless devices 14 are also referred to as master wireless devices. The base wireless devices 14 are capable of carrying out communication with the computer 12 and the display system 18 using an input/output interface (not shown) or a first communication unit (not shown). The base wireless devices 14 are capable of carrying out communication with the remote wireless devices 16 using a second communication unit (not shown) that carries out wireless communication in a frequency band of 2.4 GHz.

The remote wireless devices 16 are also referred to as slave wireless devices. The remote wireless devices 16 are each provided in each of a plurality of machinery 24 (see FIG. 1) that make up the industrial equipment. As such machinery 24, although not limited thereto, there may be cited sensors, valves, and the like. The remote wireless devices 16 are each equipped with a communication unit (not shown) that carries out wireless communication in a frequency band of 2.4 GHz. By using such a communication unit, the remote wireless devices 16 are capable of communicating with the base wireless devices 14. In the example shown in FIG. 1, one piece of the machinery 24 is provided for each one of the remote wireless devices 16. However, a plurality of the machinery 24 may be provided for each one of the remote wireless devices 16.

The base wireless devices 14 and the remote wireless devices 16 communicate with each other by way of a frequency hopping method. More specifically, the base wireless devices 14 and the remote wireless devices 16 switch between hopping frequencies at a predetermined hopping cycle to thereby transmit and receive data.

2. Display System 18

Figure 2:
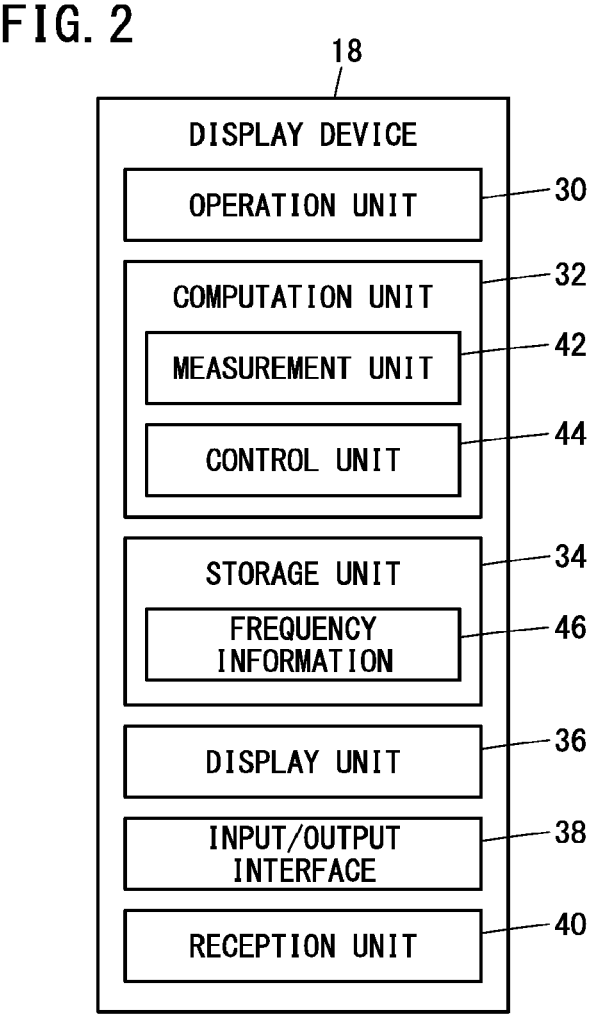
FIG. 2 is a block diagram showing the display system according to a present embodiment.

FIG. 2 is a block diagram showing the display system 18 according to the present embodiment. The display system 18, for example, includes a personal computer or a mobile terminal (a tablet type terminal, a smartphone or the like). The personal computer or the mobile terminal is capable of communicating with other devices over wires or wirelessly. FIG. 1 shows a state in which the display system 18 which includes the personal computer is connected to another device by the fieldbus 20. The display system 18 may be provided in the base wireless devices 14. Further, the display system 18 may be configured by a plurality of devices. For example, the display system 18 may be constituted by a personal computer or a mobile terminal, and the base wireless devices 14. In this case, the personal computer or the mobile terminal and the base wireless devices 14 may communicate with each other over wires or wirelessly. Further, the display system 18 may include a personal computer and a frequency measurement device (a frequency counter, a spectrum analyzer, or the like).

The display system 18 is equipped with an operation unit 30, a computation unit 32, a storage unit 34, a display unit 36, an input/output interface 38, and a reception unit 40.

Hereinafter, an embodiment will be described for a case in which the display system 18 comprises a personal computer. The operation unit 30, the computation unit 32, the storage unit 34, the display unit 36, the input/output interface 38, and the reception unit 40 may be constituted by a plurality of devices. For example, the personal computer may be equipped with the operation unit 30, and the display unit 36, and the base wireless devices 14 may be equipped with the computation unit 32, the storage unit 34, the display unit 36, and the reception unit 40.

The operation unit 30 includes, for example, at least one of a keyboard, a mouse, a touch pad, a touch panel, and a microphone. The operation unit 30 is a human-machine interface in order for the user to input data and instructions to the display system 18. The data input by the operation unit 30 is stored in the storage unit 34.

The computation unit 32 includes a processor, and more specifically, a processing circuit such as a CPU or the like. The computation unit 32 administers the control of the display system 18 in its entirety. By executing programs stored in the storage unit 34, the computation unit 32 functions as a measurement unit 42 and a control unit 44. The measurement unit 42 measures frequencies and power levels of radio waves that propagate around the periphery of the wireless devices. The control unit 44 determines non-recommended frequencies 52 (see FIG. 5, etc.) and recommended frequencies 54 (see FIG. 5, etc.), and causes the display unit 36 to display the non-recommended frequencies 52 and the recommended frequencies 54. The non-recommended frequencies 52 refer to frequencies that are being used within the 2.4 GHz frequency band. The recommended frequencies 54 refer to frequencies that are not being used within the 2.4 GHz frequency band. Moreover, at least a portion of the computation unit 32 may be realized by an integrated circuit such as an ASIC, an FPGA, or the like. Further, at least a portion of the control unit 44 may include an electronic circuit containing a discrete device. Moreover, the measurement unit 42 may include a frequency measuring device.

The storage unit 34 includes a volatile memory and a non-volatile memory. As the volatile memory, for example, there may be cited a RAM or the like. As the non-volatile memory, for example, there may be cited a ROM, a flash memory, or the like. The volatile memory is used as a working memory for the processor, and temporarily stores data and the like necessary for performing processes or calculations. In the non-volatile memory, there are stored, for example, programs, tables, maps, and the like. At least a portion of the storage unit 34 may be provided in the processor, the integrated circuit, or the like as described above.

The non-volatile memory of the storage unit 34 stores frequency information 46. For example, the frequency information 46 is information in which the numbers of channels (channel numbers) assigned to the 2.4 GHz frequency band and the occupied frequency band information are associated with each other. The channel numbers are numbers assigned to the channels assigned to the 2.4 GHz frequency band. The respective channels include occupied frequency bands of 22 MHz. The occupied frequency band information is information in relation to each of the occupied frequency bands. For example, the occupied frequency band information includes a center frequency of the occupied frequency bands, an upper limit frequency of the occupied frequency bands, and a lower limit frequency of the occupied frequency bands. For example, in the case of a wireless LAN, the communication standard of which is specified by IEEE 802.11b, then as shown in FIG. 3, the frequency information 46 associates the channel numbers of 1 ch to 14 ch with the occupied frequency bands of the respective channels. The same consideration applies to other wireless communication standards. Moreover, the non-volatile memory of the present embodiment stores the channels and the occupied frequency bands of the wireless LAN specified by IEEE 802.11b, as the frequency information 46. There are cases in which the number of channels used within the 2.4 GHz frequency band are determined independently depending on the country. Frequency information 46 is set according to the country in which the industrial wireless communication system 10 is provided.

The display unit 36 includes a monitor such as a liquid crystal display or the like. The display unit 36 displays an image 50 (see FIG. 6, etc.) in response to a display command output from the control unit 44. For example, the display unit 36 displays the image 50 in which the non-recommended frequencies 52 and the recommended frequencies 54 are included.

The input/output interface 38 includes an interface (for example, a connector, a modem, or the like) for the purpose of realizing a fieldbus connection.

The reception unit 40 is constituted, for example, by an antenna and a communication module. The reception unit 40 receives radio waves that propagate in a space in which the industrial equipment is installed.

3. Process of Displaying Recommended Frequencies 54 and Non-Recommended Frequencies 52

[3.1. First Display Process]

Figure 4:
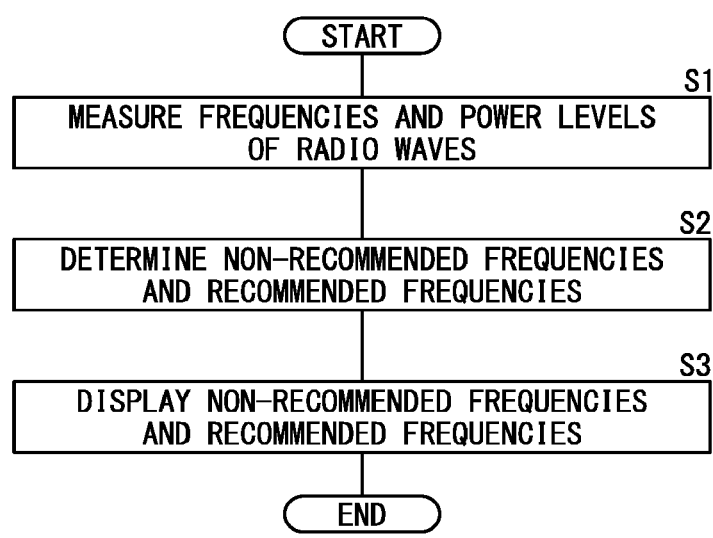
FIG. 4 is a flowchart showing a first display process performed by the display system.
Figure 5:
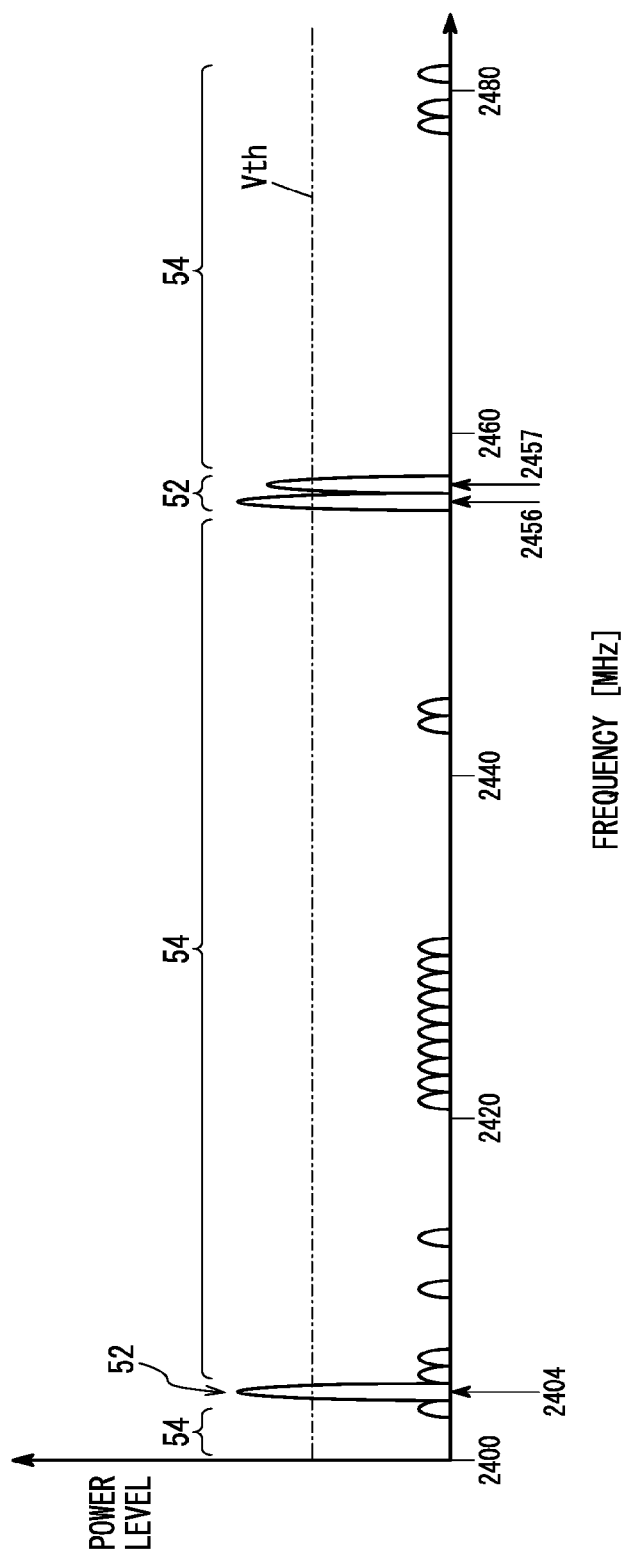
FIG. 5 is a diagram showing measurement results of power levels for each of respective frequencies.
Figure 6:
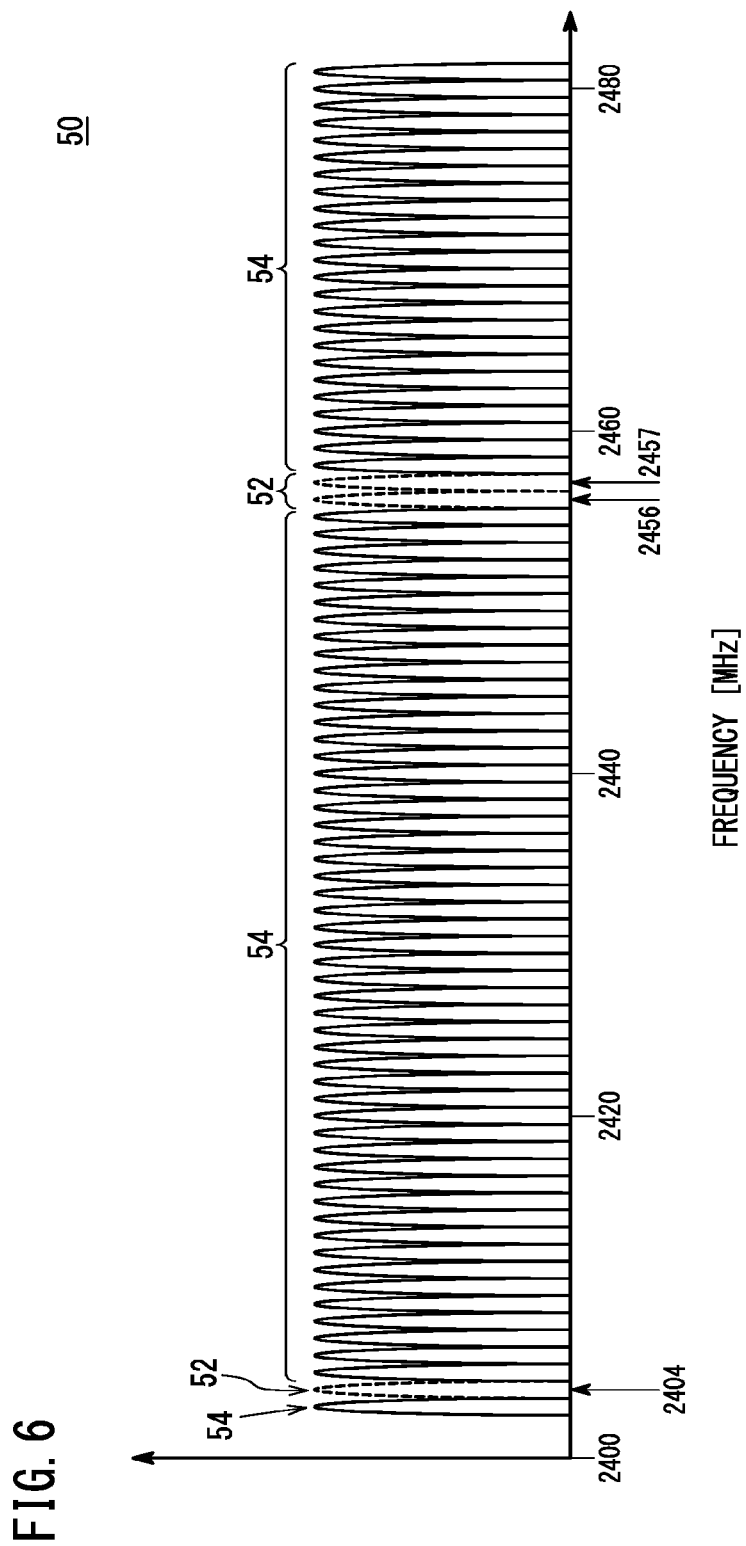
FIG. 6 is a diagram showing an example of an image displayed by a display unit in the first display process.
Figure 7:
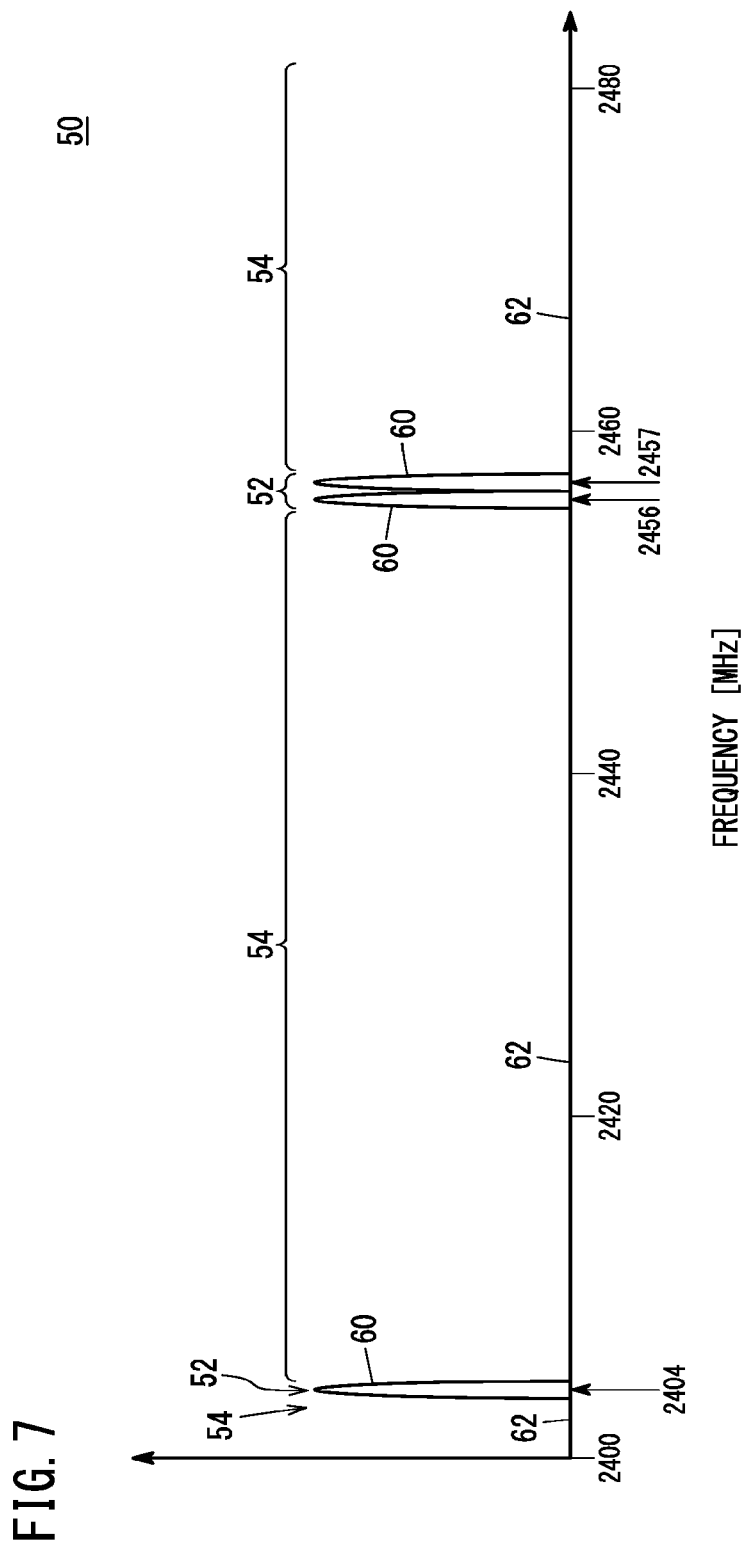
FIG. 7 is a diagram showing an example of an image displayed by the display unit in the first display process.
Figure 8:
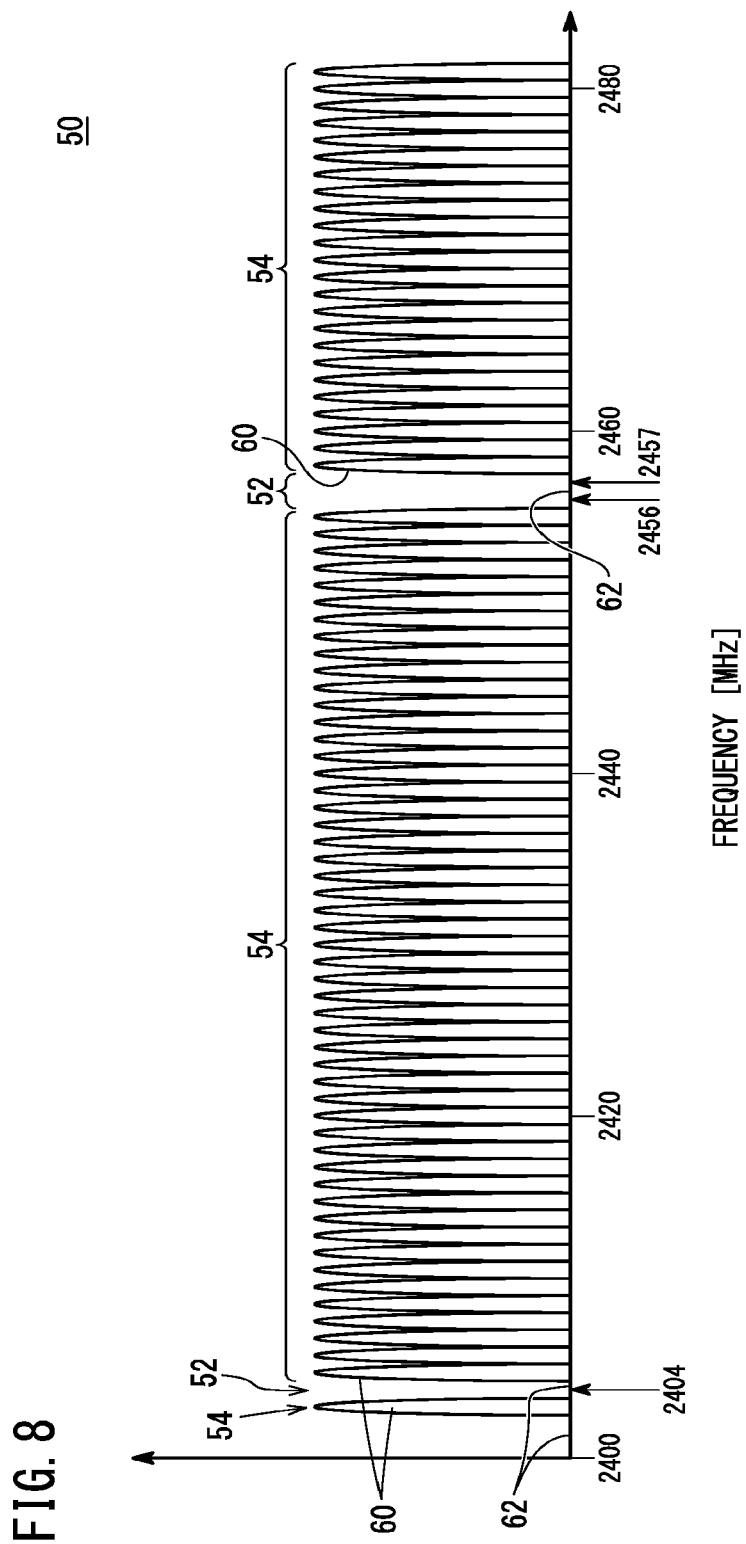
FIG. 8 is a diagram showing an example of an image displayed by the display unit in the first display process.

FIG. 4 is a flowchart showing a first display process performed by the display system 18. FIG. 5 is a diagram showing measurement results of power levels for each of the respective frequencies. FIGS. 6 to 8 are diagrams showing examples of the image 50 displayed by the display unit 36 in the first display process. Prior to newly installing a wireless device in the industrial equipment, the user uses the display system 18 to investigate frequencies that are not being used. The user uses the operation unit 30 to perform input operations of data such as a set time period and a power threshold value or the like. In accordance with the input operations made by the user, the operation unit 30 outputs data such as the set time period and the power threshold value or the like to the storage unit 34. The storage unit 34 stores the data output from the operation unit 30. Moreover, the storage unit 34 may store the set time period and the power threshold value in advance. When the user performs a predetermined operation on the operation unit 30, the display system 18 initiates the first display process described below.

In step S1, the reception unit 40 receives radio waves that propagate in a space in which the industrial equipment is disposed. The measurement unit 42 measures, within the input set time period, the frequencies and the power levels of the radio waves received by the reception unit 40. When the measurement is completed, the process proceeds to step S2.

In step S2, on the basis of the measurement results of the measurement unit 42, the control unit 44 identifies the frequencies of the radio waves the power of which is greater than or equal to the power threshold value, and the frequencies of the radio waves the power of which is less than the power threshold value. The control unit 44 determines the frequencies of the radio waves the power of which is greater than or equal to the power threshold value, as being the non-recommended frequencies 52. The control unit 44 determines the frequencies of the radio waves the power of which is less than the power threshold value, as being the recommended frequencies 54. In the example shown in FIG. 5, the power levels of the radio waves having frequencies of 2404 MHz, 2456 MHz, and 2457 MHz are greater than or equal to the power threshold value (Vth). In the example shown in FIG. 5, the control unit 44 determines the frequencies of 2404 MHz, 2456 MHz, and 2457 MHz as being the non-recommended frequencies 52. The control unit 44 determines the frequencies other than the frequencies of 2404 MHz, 2456 MHz, and 2457 MHz as being the recommended frequencies 54. When step S2 is completed, the process proceeds to step S3.

In step S3, the control unit 44 causes the non-recommended frequencies 52 and the recommended frequencies 54 to be displayed on the display unit 36 so as to be distinguishable from each other. The display unit 36 displays the image 50 in response to a display command output from the control unit 44. An example of the image 50 is shown in FIG. 6. A graph is shown in the image 50. In such a graph, respective frequencies from 2403 MHz to 2481 MHz are arranged in the horizontal direction, and the non-recommended frequencies 52 and the recommended frequencies 54 are shown separately in the vertical direction. In the image 50 shown in FIG. 6, among the frequency bands of 2403 MHz to 2481 MHz, the frequencies excluding the frequencies of 2404 MHz, 2456 MHz, and 2457 MHz are represented by solid lines. The frequencies displayed by the solid lines are the recommended frequencies 54. The bandwidth of each of the recommended frequencies 54 is 1 MHz. On the other hand, the frequencies of 2404 MHz, 2456 MHz, and 2457 MHz are represented by dashed lines. The frequencies displayed by the dashed lines are the non-recommended frequencies 52.

As shown in FIG. 6, as one example thereof, the display unit 36 displays the non-recommended frequencies 52 by dashed lines and the recommended frequencies 54 by solid lines. However, the display unit 36 may display the non-recommended frequencies 52 and the recommended frequencies 54 in different colors. Alternatively, the display unit 36 may display each of the non-recommended frequencies 52 and the recommended frequencies 54 by numerical values.

The display unit 36 may display the non-recommended frequencies 52 and the recommended frequencies 54 in different display forms. For example, as shown in FIG. 7, the display unit 36 may display the non-recommended frequencies 52 as convex portions 60 that project toward the plus side of the vertical axis. Further, the display unit 36 may display the recommended frequencies 54 as flat portions 62 that overlap with the horizontal axis. Conversely, as shown in FIG. 8, the display unit 36 may display the recommended frequencies 54 as convex portions 60 that project toward the plus side of the vertical axis. Further, the display unit 36 may display the non-recommended frequencies 52 as flat portions 62 that overlap with the horizontal axis. In this case, the display unit 36 may switch between and display the image 50 shown in FIG. 7 and the image 50 shown in FIG. 8. Switching between the images 50 may be carried out by an operation performed by the operation unit 30.

According to the first display process, frequencies that are not being used in the industrial equipment are displayed on the display unit 36. Therefore, the user can easily be made aware of the free frequencies existing within a predetermined frequency band, for example, the 2.4 GHz frequency band.

[3.2. Second Display Process]

The frequencies that are used change from moment to moment. Therefore, there may be cases in which the measured frequencies differ depending on the timing at which the measurements in step S1 of the first display process are performed. Thus, in the second display process, in the case that a predetermined number or more of the non-recommended frequencies 52 exists within the occupied frequency bands corresponding to the channels, all of the frequencies included within the occupied frequency bands corresponding to such channels are displayed as the non-recommended frequencies 52. The power levels of the non-recommended frequencies 52 are greater than or equal to the power threshold value. As a result, it is possible to prevent the frequencies included within the frequency bands that are already being used in the industrial equipment from being erroneously determined as the recommended frequencies 54.

Figure 9:
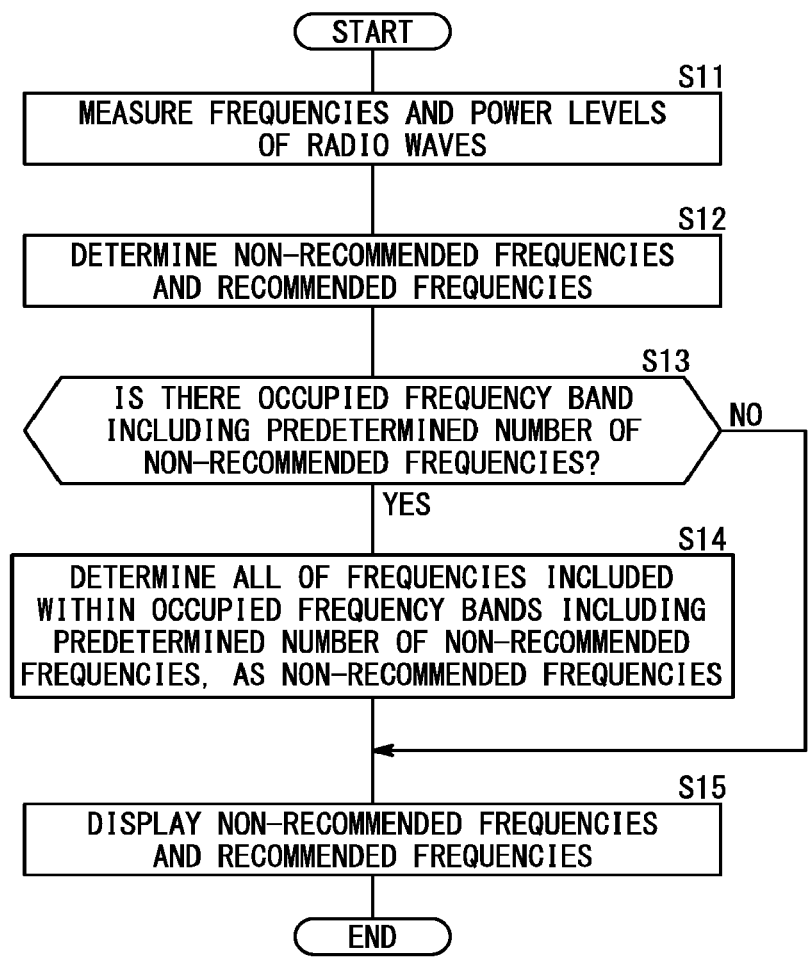
FIG. 9 is a flowchart showing a second display process performed by the display system.
Figure 10:
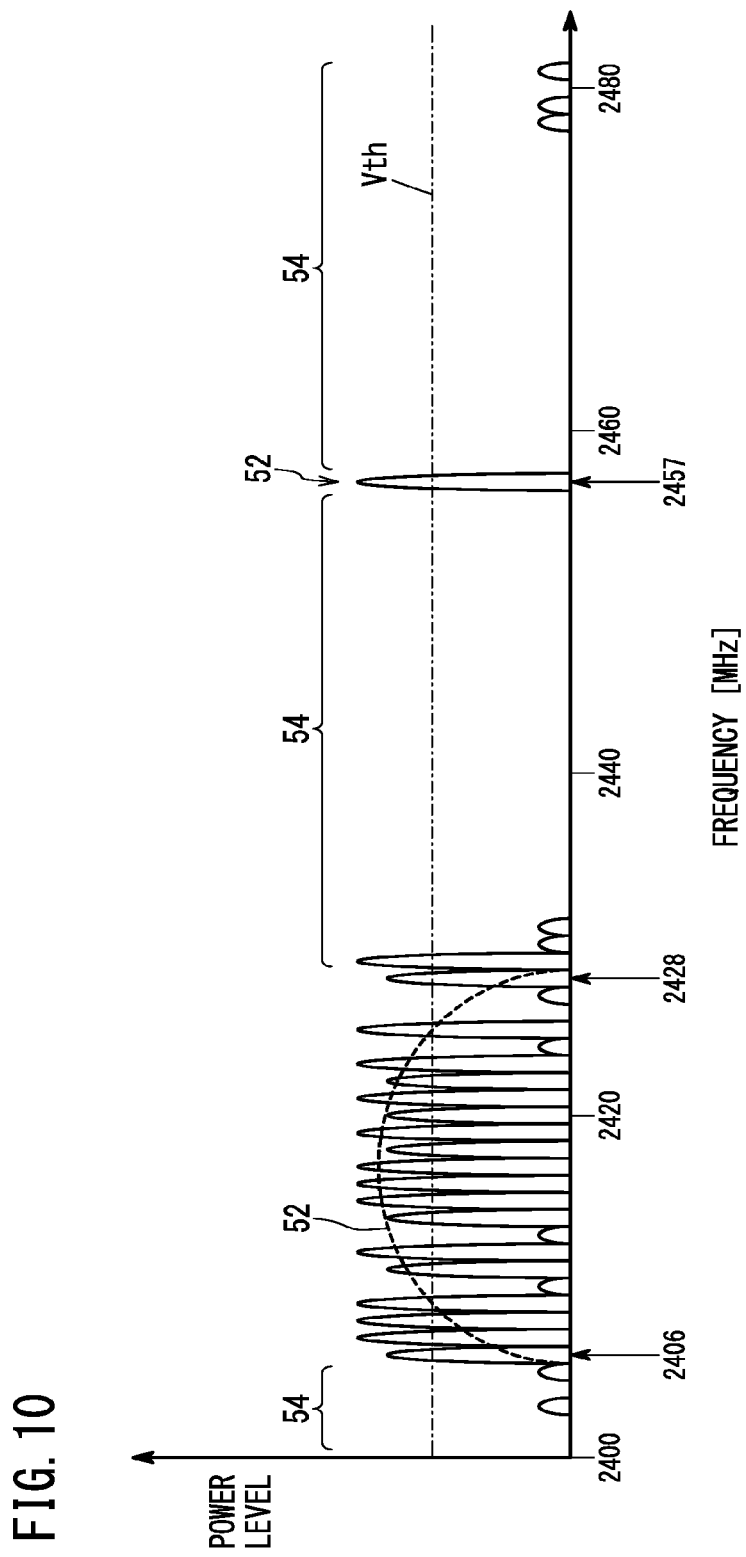
FIG. 10 is a diagram showing measurement results of power levels for each of respective frequencies.
Figure 11:
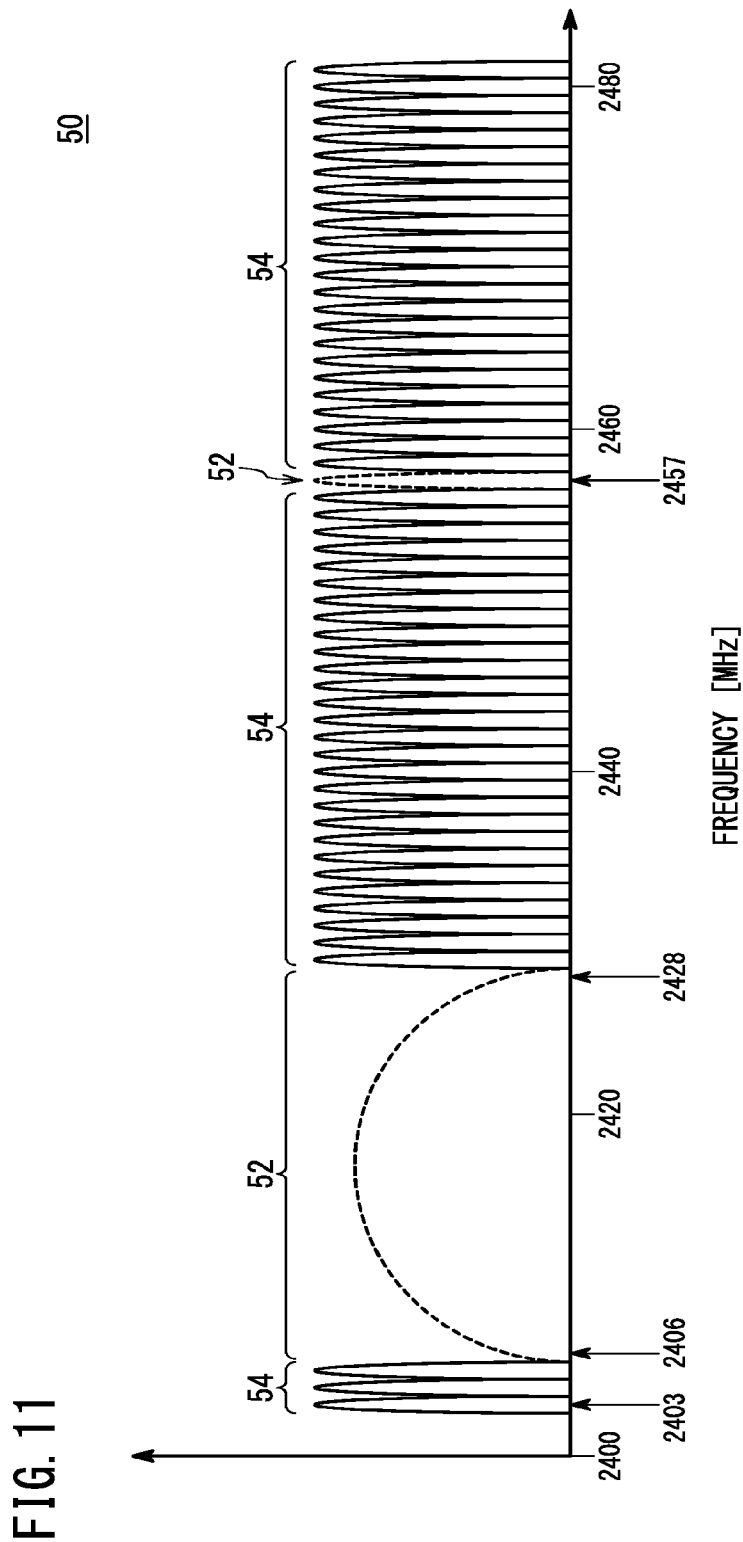
FIG. 11 is a diagram showing an example of an image displayed by the display unit in the second display process.

FIG. 9 is a flowchart showing a second display process performed by the display system 18. FIG. 10 is a diagram showing measurement results of power levels for each of the respective frequencies. FIG. 11 is a diagram showing one example of the image 50 displayed by the display unit 36 in the second display process. The processes of step S11 and step S12 shown in FIG. 9 are the same as the processes of step S1 and step S2 shown in FIG. 4. Therefore, hereinafter, a description will be given of the processes of steps S13 to S15 in which the second display process differs from the first display process.

In step S13, the control unit 44 reads out the frequency information 46 that is stored in the storage unit 34. The control unit 44 determines whether or not there is a relationship between the non-recommended frequencies 52 determined in step S12 and the occupied frequency bands associated with the channels indicated by the frequency information 46. For example, the control unit 44 determines the number of the non-recommended frequencies 52 included within each of the occupied frequency bands. The control unit 44 determines the presence or absence of occupied frequency bands in which a predetermined number of the non-recommended frequencies 52 is included. The predetermined number may be stored in advance in the storage unit 34 or may be set by the user. In the case of there being an occupied frequency band including the predetermined number of the non-recommended frequencies 52 (step S13: YES), the process proceeds to step S14. On the other hand, in the case of there not being an occupied frequency band including the predetermined number of the non-recommended frequencies 52 (step S13: NO), the process proceeds to step S15.

In step S14, the control unit 44 identifies the occupied frequency bands in which the predetermined number of the non-recommended frequencies 52 is included. The control unit 44 determines that all of the frequencies included within the identified occupied frequency bands are the non-recommended frequencies 52. As is well known, the frequency bands from 2401 MHz to 2483 MHz include the respective channels from 1 ch to 13 ch. The respective channels include twenty-two frequencies which are partitioned by 1 MHz each. In the example shown in FIG. 10, among the frequencies included within a 2 ch occupied frequency band (from 2406 MHz to 2428 MHz), the power levels of eighteen of the frequencies are greater than or equal to the power threshold value. In the case that a numerical value of less than eighteen is set as the predetermined number, the control unit 44 determines that all of the frequencies included within the 2 ch occupied frequency band are the non-recommended frequencies 52. When step S14 is completed, the process proceeds to step S15.

In step S15, the control unit 44 causes the non-recommended frequencies 52 and the recommended frequencies 54 to be displayed on the display unit 36 so as to be distinguishable from each other. In response to a display command output from the control unit 44, for example, the display unit 36 displays the image 50 shown in FIG. 11. In the image 50 shown in FIG. 11, at least one of the recommended frequencies 54 included within the frequency bands from 2403 MHz to 2481 MHz is displayed by a solid line. However, in the image shown in FIG. 11, the 2 ch occupied frequency band (from 2406 MHz to 2428 MHz) and the frequency of 2457 MHz are not displayed by solid lines. In the image shown in FIG. 11, the 2 ch occupied frequency band (from 2406 MHz to 2428 MHz) and the frequency of 2457 MHz are displayed by dashed lines as the non-recommended frequencies 52.

According to the second display process, in the case that a certain channel is being used, even if some of the frequencies included within the occupied frequency bands of the channel are not detected at the time of measurement, all of the frequencies included within the occupied frequency bands can be determined as being the non-recommended frequencies 52. Accordingly, it is possible to prevent the frequencies that are already being used in the industrial equipment from being erroneously determined as the recommended frequencies 54.

[3.3. Third Display Process]

The third display process is a process in which the second display process is simplified. According to the third display process, in the case that the difference between two of the non-recommended frequencies 52 is less than or equal to a predetermined difference (MHz), all of the frequencies between the two non-recommended frequencies 52 are displayed as being the non-recommended frequencies 52.

FIG. 12 is a flowchart showing the third display process performed by the display system 18. The processes of step S21 and step S22 shown in FIG. 12 are the same as the processes of step S1 and step S2 shown in FIG. 4. Therefore, hereinafter, a description will be given of the processes of steps S23 to S25 in which the third display process differs from the second display process.

In step S23, in the case that a plurality of the non-recommended frequencies 52 exist, the control unit 44 determines the presence or absence of two of the non-recommended frequencies 52 for which a frequency difference therebetween is less than or equal to a predetermined difference. Moreover, the predetermined difference may be stored in advance in the storage unit 34. The predetermined difference may be set by the user. In the case of there being two of the non-recommended frequencies 52 for which the frequency difference therebetween is less than or equal to the predetermined difference (step S23: YES), the process proceeds to step S24. On the other hand, in the case of there not being two of the non-recommended frequencies 52 for which the frequency difference therebetween is less than or equal to the predetermined difference (step S23: NO), the process proceeds to step S25.

In step S24, the control unit 44 makes the following determination concerning two of the non-recommended frequencies 52 for which the frequency difference therebetween is less than or equal to the predetermined difference. More specifically, the control unit 44 determines that all of the frequencies between the two non-recommended frequencies 52 are also the non-recommended frequencies 52. When step S24 is completed, the process proceeds to step S25.

In step S25, the control unit 44 causes the non-recommended frequencies 52 and the recommended frequencies 54 to be displayed on the display unit 36 so as to be distinguishable from each other. In response to a display command output from the control unit 44, the display unit 36 displays the non-recommended frequencies 52 and the recommended frequencies 54 so as to be distinguishable from each other.

According to the third display process, in the case that the difference between the two of the non-recommended frequencies 52 is less than or equal to the predetermined difference, all of the frequencies between the two non-recommended frequencies 52 are determined as being the non-recommended frequencies 52. Accordingly, it is possible to prevent the frequencies that are already being used in the industrial equipment from being erroneously determined as the recommended frequencies 54.

[3.4. Fourth Display Process]

FIG. 13 is a flowchart showing a fourth display process performed by the display system 18. FIG. 14 is a diagram showing results of measurement of power levels performed periodically. FIG. 15 is a diagram showing one example of the image 50 displayed by the display unit 36 in the fourth display process. In the same manner as in the first to third display processes, the user uses the operation unit 30 to perform input operations of various data. Moreover, as data unique to the fourth display process, there are a maximum value Nmax of the number of measurements and a degree threshold value. The operation unit 30 outputs, to the storage unit 34, data such as the maximum value Nmax and the degree threshold value input by the user. When the user performs a predetermined operation on the operation unit 30, the display system 18 initiates the fourth display process described below. In the present specification, a degree of usage is the number of times of being used within a certain period of time. The degree threshold value is a threshold value of the degree of usage.

In step S31, the measurement unit 42 sets a count number N to 0. In step S32, in the same manner as in step S1 of FIG. 4, the measurement unit 42 measures, within an input set time period, the frequencies and the power levels of the radio waves received by the reception unit 40. In step S33, the measurement unit 42 adds 1 to the count number N. In step S34, the measurement unit 42 determines whether or not the count number N is greater than or equal to the maximum value Nmax. In the case that the count number N is greater than or equal to the maximum value Nmax (step S34: YES), the process proceeds to step S35. On the other hand, in the case that the count number N is not greater than or equal to the maximum value Nmax (step S34: NO), the process returns to step S32. In other words, in the fourth display process, the process of step S32 is performed for a number of times set by the user. The process of step S32 is performed periodically. Further, a time interval between an nth measurement and an (n+1)th measurement is on the order of 20 [μs] to 5 [ms]. The storage unit 34 stores the measurement results for each measurement.

In step S35, the control unit 44 reads out each of the measurement results of step S32 from the storage unit 34. Among the frequencies of the radio waves the power levels of which are greater than or equal to the power threshold value, the control unit 44 determines that the frequencies with a degree of usage greater than or equal to the degree threshold value, as being the non-recommended frequencies 52. Furthermore, the control unit 44 determines frequencies other than the non-recommended frequencies 52 included within the 2.4 GHz frequency band, as being the recommended frequencies 54. Details thereof will be described below.

In FIG. 14, the X-axis indicates the frequencies, the Y-axis indicates the power levels, and the Z-axis indicates time. The time shown on the Z axis corresponds to an elapsed time from the initiation of measurement in the first instance of step S32 to the completion of measurement in the last instance of step S32. FIG. 14 shows only the power levels of the frequencies of the radio waves the power levels of which are greater than or equal to the power threshold value. In this example, the degree of usage of the frequency f1 is five times, the degree of usage of the frequency f2 is two times, and the degree of usage of the frequency f3 is four times. For example, in the case that three times is set as the degree threshold value, the degree of usage of the frequency f1 (five times) and the degree of usage of the frequency f3 (four times) are greater than or equal to the degree threshold value. In this case, the control unit 44 determines that the frequency f1 and the frequency f3 are the non-recommended frequencies 52. The control unit 44 determines the frequencies other than the non-recommended frequencies 52 as being the recommended frequencies 54. When step S35 is completed, the process proceeds to step S36.

In step S36, the control unit 44 causes the display unit 36 to display the non-recommended frequencies 52 and the recommended frequencies 54. Furthermore, the control unit 44 causes the frequencies added with the degree of usage to be displayed. In response to a display command output from the control unit 44, for example, the display unit 36 displays the image 50 shown in FIG. 15. In the image 50 shown in FIG. 15, the non-recommended frequencies 52 and the recommended frequencies 54 are displayed separately. The non-recommended frequencies 52 are displayed with the information "high degree of usage" added thereto. Furthermore, a portion of the recommended frequencies (frequency f2) is displayed with the information "low degree of usage" added thereto.

The control unit 44 is also capable of setting, for the base wireless devices 14, the recommended frequencies 54 as frequencies to be used. In the case of there being a plurality of the recommended frequencies 54, the control unit 44 may set a frequency the degree of usage of which is lowest. The control unit 44 may also set an arbitrary frequency.

Moreover, the display system 18 is also capable of displaying the degree of usage in the form of a percentage. In this case, the control unit 44 counts, for each of the frequencies, the number of times that the power levels of the radio waves becomes greater than or equal to the power threshold value. Furthermore, in step S36, the control unit 44 divides the number of times counted for each of the frequencies by the total number of measurements (=Nmax). The control unit 44 causes the calculated values to be displayed as the degree of usage (%) on the display unit 36.

According to the fourth display process, the user can be made aware of the degree of usage of the frequencies that are already being used in the industrial equipment. Further, the user is capable of setting the frequencies while avoiding those frequencies the degree of usage of which is high, from among the frequencies already being used in the industrial equipment.

4. Setting of Frequencies

The user can specify one of the base wireless devices 14 by operating the operation unit 30. The user is capable of setting any arbitrary frequency from among the recommended frequencies 54 displayed on the display unit 36. The control unit 44 transmits the frequency selected by the user to the base wireless device 14 that has been selected by the user. The base wireless device 14 carries out wireless communication using such a frequency.

5. Technical Concepts that can be Obtained from the Embodiment

Hereinafter, technical concepts which are capable of being grasped from the above-described embodiment will be described.

The first aspect of the present invention is characterized by the display system 18 which displays, on the display unit 36, the recommended frequencies 54 recommended for use in the wireless device (the base wireless devices 14 and the remote wireless devices 16) that carries out transmission and reception of data by switching between hopping frequencies in a predetermined frequency band (for example, the 2.4 GHz frequency band), the display system comprising the measurement unit 42 that measures, within the set time period set in advance, the frequencies and the power levels of the radio waves propagating around the periphery of the wireless device, and the control unit 44 that determines the frequencies of the radio waves for which the power levels measured by the measurement unit 42 are less than the power threshold value set in advance, as being the recommended frequencies 54, and causes the display unit 36 to display the recommended frequencies 54.

According to the above-described configuration, frequencies that are not being used are displayed on the display unit 36. Therefore, the user can easily be made aware of the free frequencies existing within a predetermined frequency band, for example, the 2.4 GHz frequency band.

In the first aspect of the present invention, there may further be provided the operation unit 30 in order for the user to input the set time period.

In accordance with the above-described configuration, the user is capable of setting an appropriate set time period in accordance with the operational status of the industrial equipment. For example, in the case that wireless communications are frequently carried out in the industrial equipment, the set time period may be made shorter. In the case that wireless communications are not carried out very much, it is preferable for the set time period to be made longer.

In the first aspect of the present invention, there may further be provided the operation unit 30 in order for the user to input the power threshold value.

In accordance with the above-described configuration, the user is capable of appropriately setting the power threshold value in accordance with the condition of the radio waves in the industrial equipment. For example, in the case that the intensity of the radio waves is strong, the power threshold value may be made higher. In the case that the intensity of the radio waves is weak, the power threshold value may be made lower.

In the first aspect of the present invention, there may further be provided the storage unit 34 that stores, in advance, the plurality of occupied frequency bands that are set in the frequency band, wherein the control unit 44 may determine the frequencies of the radio waves having the power levels greater than or equal to the power threshold value, as being the non-recommended frequencies 52, may determine all of frequencies of the occupied frequency bands including a predetermined number or more of the non-recommended frequencies 52, as being the non-recommended frequencies 52, and may determine frequencies that are included within the frequency band and that are other than the non-recommended frequencies 52 as being the recommended frequencies 54.

In the case that channels of a predetermined communication standard are used, it is preferable for the control unit 44 to set all of the frequencies included within the occupied frequency bands of such channels as being the non-recommended frequencies 52. According to the above-described configuration, in the case that a certain channel is being used, even if some of the frequencies included within the occupied frequency bands of the channel are not detected at the time of measurement, it becomes possible for all of the frequencies included within the occupied frequency bands to be determined as being the non-recommended frequencies 52. Accordingly, it is possible to prevent the frequencies that are already being used from being erroneously determined as the recommended frequencies 54.

In the first aspect of the present invention, the control unit 44 may determine the frequencies of the radio waves having the power levels greater than or equal to the power threshold value, as being the non-recommended frequencies 52, and in the case that a difference between two of the non-recommended frequencies 52 is less than or equal to a predetermined difference, the control unit 44 may determine all of frequencies between the two non-recommended frequencies 52 as being the non-recommended frequencies 52, and may determine the frequencies that are included within the frequency band and that are other than the non-recommended frequencies 52 as being the recommended frequencies 54.

In the case that the frequencies of two of the radio waves the power levels of which are greater than or equal to the power threshold value, are in close proximity to each other, there is a possibility that the frequencies between the two frequencies are being used. According to the above-described configuration, in the case that the difference between the two of the non-recommended frequencies 52 is less than or equal to the predetermined difference, all of the frequencies between the two non-recommended frequencies 52 are determined as being the non-recommended frequencies 52. Accordingly, it is possible to prevent the frequencies that are already being used from being erroneously determined as the recommended frequencies 54.

In the first aspect of the present invention, the control unit 44 may determine the frequencies of the radio waves having the power levels greater than or equal to the power threshold value, as being the non-recommended frequencies 52, may determine the frequencies that are included within the frequency band and that are other than the non-recommended frequencies 52 as being the recommended frequencies 54, and may cause the display unit 36 to display the non-recommended frequencies 52 and the recommended frequencies 54 in different display forms.

In the first aspect of the present invention, the measurement unit 42 may periodically perform a process of measuring the frequencies and the power levels of the radio waves within the set time period, and the control unit 44 may cause the display unit 36 to display the degree of usage of the frequencies of the radio waves having the power levels greater than or equal to the power threshold value.

In accordance with the above-described configuration, the user can be made aware of the degree of usage of the frequencies that are already being used.

In the first aspect of the present invention, there may further be provided the operation unit 30 in order for the user to input the degree threshold value of the non-recommended frequencies, wherein the measurement unit 42 may periodically perform a process of measuring the frequencies and the power levels of the radio waves within the set time period, and the control unit 44 may determine, from among the frequencies of the radio waves having the power levels greater than or equal to the power threshold value, frequencies with a degree of usage greater than or equal to the degree threshold value as being the non-recommended frequencies 52, and may determine the frequencies that are included within the frequency band and that are other than the non-recommended frequencies 52 as being the recommended frequencies 54.

In accordance with the above-described configuration, from among the frequencies already being used, the user is capable of setting the frequencies while avoiding those frequencies the degree of usage of which is high.

In the first aspect of the present invention, the control unit 44 may set, for the wireless device (the base wireless devices 14), the recommended frequencies 54 as frequencies to be used.

The second aspect of the present invention is characterized by the display system 18 which displays, on the display unit 36, the non-recommended frequencies 52 not recommended for use in the wireless device (the base wireless devices 14 and the remote wireless devices 16) that carries out transmission and reception of data by switching between hopping frequencies in a predetermined frequency band (for example, the 2.4 GHz frequency band), the display system comprising the measurement unit 42 that measures, within the set time period set in advance, the frequencies and the power levels of the radio waves propagating around the periphery of the wireless device, and the control unit 44 that determines the frequencies of the radio waves for which the power levels measured by the measurement unit 42 are greater than or equal to the power threshold value set in advance, as being the non-recommended frequencies 52, and causes the display unit 36 to display the non-recommended frequencies 52.

According to the above-described configuration, the frequencies that are being used are displayed on the display unit 36. Therefore, the user can easily be made aware of the frequencies that are being used within a predetermined frequency band, for example, the 2.4 GHz frequency band. As a result, the user can also easily be made aware of the free frequencies.

The display system according to the present invention is not limited to the above-described embodiment, and various additional or alternative configurations may be adopted therein without deviating from the essence and gist of the present invention.

What is claimed is:

1. A display system that displays, on a display unit, recommended frequencies recommended for use in a wireless device configured to carry out transmission and reception of data by switching between hopping frequencies in a predetermined frequency band, the display system comprising:
   a measurement unit configured to measure, within a set time period set in advance, frequencies and power levels of radio waves propagating around a periphery of the wireless device; and
   a control unit configured to determine frequencies of the radio waves having the power levels greater than or equal to the power threshold value, as being non-recommended frequencies, determines frequencies that are included within the frequency band and that are other than the non-recommended frequencies, as being the recommended frequencies, and to cause the display unit to display the non-recommended frequencies and the recommended frequencies in different display forms,
   wherein the measurement unit periodically performs a process of measuring the frequencies and the power levels of the radio waves within the set time period; and
   the control unit causes the display unit to display at least one of:
   a degree of usage of the frequencies of the radio waves having the power levels greater than or equal to the power threshold value, and
   a degree of usage of the frequencies of the radio waves having the power levels less than the power threshold value.

2. The display system according to claim 1, further comprising an operation unit configured to enable the user to input the set time period.

3. The display system according to claim 1, further comprising an operation unit configured to enable the user to input the power threshold value.

4. The display system according to claim 1, further comprising a storage unit configured to store, in advance, a plurality of occupied frequency bands that are set in the frequency band,
   wherein the control unit determines all of frequencies of the occupied frequency bands including a predetermined number or more of the non-recommended frequencies, as being the non-recommended frequencies, and determines frequencies that are included within the frequency band and that are other than the non-recommended frequencies as being the recommended frequencies.

5. The display system according to claim 1, wherein in a case that a difference between two of the non-recommended frequencies is less than or equal to a predetermined difference, the control unit determines all of frequencies between the two non-recommended frequencies as being the non-recommended frequencies, and determines frequencies that are included within the frequency band and that are other than the non-recommended frequencies as being the recommended frequencies.

6. The display system according to claim 1, further comprising an operation unit configured to enable the user to input a degree threshold value of the non-recommended frequencies,
   wherein the measurement unit periodically performs a process of measuring the frequencies and the power levels of the radio waves within the set time period, and
   the control unit determines, from among the frequencies of the radio waves having the power levels greater than or equal to the power threshold value, frequencies with a degree of usage greater than or equal to the degree threshold value as being the non-recommended frequencies, and determines frequencies that are included within the frequency band and that are other than the non-recommended frequencies as being the recommended frequencies.

7. The display system according to claim 6, wherein the control unit sets, for the wireless device, the recommended frequencies as frequencies to be used.

* * * * *